United States Patent
Luo et al.

(10) Patent No.: US 12,384,734 B2
(45) Date of Patent: Aug. 12, 2025

(54) GAS GENERANT COMPOSITION, PREPARATION METHOD THEREFOR, AND USE THEREOF

(71) Applicant: HUBEI HANGPENG CHEMICAL POWER TECHNOLOGY CO., LTD., Hubei (CN)

(72) Inventors: Yunqiang Luo, Hubei (CN); Xiangning Ren, Hubei (CN); Tao Du, Hubei (CN); Jun Zhang, Hubei (CN); Xiaochen Shen, Hubei (CN)

(73) Assignee: HUBEI HANGPENG CHEMICAL POWER TECHNOLOGY CO., LTD., Hubei (CN)

(*) Notice: Subject to any disclaimer, the term of this patent is extended or adjusted under 35 U.S.C. 154(b) by 991 days.

(21) Appl. No.: 17/478,013

(22) Filed: Sep. 17, 2021

(65) Prior Publication Data

US 2022/0009853 A1   Jan. 13, 2022

Related U.S. Application Data

(63) Continuation-in-part of application No. PCT/CN2021/075533, filed on Feb. 5, 2021.

(30) Foreign Application Priority Data

May 15, 2020 (CN) .......................... 202010414327.9

(51) Int. Cl.
*C06D 5/06* (2006.01)
*B60R 21/264* (2006.01)
*C06B 31/00* (2006.01)

(52) U.S. Cl.
CPC ............ *C06D 5/06* (2013.01); *B60R 21/2644* (2013.01); *C06B 31/00* (2013.01)

(58) Field of Classification Search
None
See application file for complete search history.

(56) References Cited

U.S. PATENT DOCUMENTS

| | | | | |
|---|---|---|---|---|
| 2,981,616 A | * | 4/1961 | Boyer | ........... C06B 35/00 149/35 |
| 3,794,588 A | * | 2/1974 | Stiles | ........... B01D 53/8656 502/174 |

(Continued)

FOREIGN PATENT DOCUMENTS

| CN | 1125932 A | 7/1996 |
|---|---|---|
| CN | 1132501 A | 10/1996 |

(Continued)

OTHER PUBLICATIONS

Notification to Grant Patent Right for Invention issued in priority application CN 2020104143279, 4 pages (Jul. 19, 2021).

(Continued)

*Primary Examiner* — Aileen B Felton
(74) *Attorney, Agent, or Firm* — J. Peter Paredes; Amin Wasserman Gurnani LLP

(57) ABSTRACT

Provided are a gas generant composition, a preparation method, and a gas generator containing the composition. The gas generant composition includes components having the following contents, in percent by mass: 40% to 60% of guanidine nitrate, 25% to 50% of basic copper nitrate, 0% to 7% of ammonium perchlorate, 1% to 10% of a slag-forming agent, and 0.05% to 5% of a release agent/lubricant, the slag-forming agent is used as a form-retaining agent, so that the tablets can retain their form before combustion very well after combustion, thereby completely avoiding burning of an inflatable bag due to melting and splashing of the combusted tablets. Moreover, ammonium perchlorate is used as auxiliary oxidizers, thereby reducing the amount of basic cupric (Continued)

nitrate used and reducing molten copper residues. The gas generant composition is mainly used in a gas generator for vehicle airbag.

9 Claims, 4 Drawing Sheets

(56) References Cited

U.S. PATENT DOCUMENTS

| | | | |
|---|---|---|---|
| 4,296,084 | A | 10/1981 | Adams et al. |
| 5,827,996 | A | 10/1998 | Yoshida et al. |
| 5,847,311 | A * | 12/1998 | Ryder ............... C06D 5/00 |
| | | | 149/19.5 |
| 6,143,102 | A | 11/2000 | Mendenhall et al. |
| 2002/0048542 | A1 * | 4/2002 | Deeba ............ F01N 3/0814 |
| | | | 502/328 |
| 2002/0148542 | A1 | 10/2002 | Taylor et al. |
| 2006/0096679 | A1 * | 5/2006 | Taylor ............... C06D 5/06 |
| | | | 149/45 |
| 2006/0191614 | A1 * | 8/2006 | Wu ................. C06B 23/001 |
| | | | 149/46 |
| 2010/0116384 | A1 | 5/2010 | Mendenhall et al. |
| 2012/0160379 | A1 * | 6/2012 | Marlin ............... C06D 5/06 |
| | | | 149/45 |
| 2022/0009853 | A1 * | 1/2022 | Luo ................. C06B 31/00 |

FOREIGN PATENT DOCUMENTS

| | | | |
|---|---|---|---|
| CN | 1150794 | A | 5/1997 |
| CN | 1277598 | A | 12/2000 |
| CN | 1303338 | A | 7/2001 |
| CN | 1566040 | A | 1/2005 |
| CN | 1651360 | A | 8/2005 |
| CN | 1714059 | A | 12/2005 |
| CN | 1951882 | A | 4/2007 |
| CN | 101234943 | A | 8/2008 |
| CN | 101415659 | A | 4/2009 |
| CN | 101952227 | A | 1/2011 |
| CN | 102423805 | A | 4/2012 |
| CN | 104289828 | A | 1/2015 |
| CN | 105358507 | A | 2/2016 |
| CN | 105801326 | A | 7/2016 |
| CN | 107501018 | A | 12/2017 |
| CN | 107698415 | A | 2/2018 |
| CN | 107840772 | A | 3/2018 |
| CN | 108218648 | A | 6/2018 |
| CN | 111548242 | A | 8/2020 |
| CN | 111675589 | A | 9/2020 |
| EP | 1342705 | A1 | 9/2003 |
| EP | 1568673 | A1 | 8/2005 |
| JP | 2009137832 | A | 6/2009 |
| WO | 9625375 | A1 | 8/1996 |
| WO | 2004024652 | A1 | 3/2004 |
| WO | 2009126182 | A1 | 10/2009 |
| WO | 2009126282 | A1 | 10/2009 |

OTHER PUBLICATIONS

Office Action No. 1 issued in priority application CN 2020104143279, 6 pages (Feb. 19, 2021).
Report of first search of priority document 2020104143279 by the China National Intellectual Property Administration, 3 pages.
Report of supplementary search of priority document 2020104143279 by the China National Intellectual Property Administration, 1 page.
European Patent Office, Examination Report issued in corresponding application EP21737332.2 dated Mar. 23, 2022, 7 pages.
WIPO/ISA/EPO, International Search Report and Written Opinion issued in corresponding International Application No. PCT/CN2021/075533 on May 10, 2021, 10 pages.

* cited by examiner

GAS GENERANT COMPOSITION, PREPARATION METHOD THEREFOR, AND USE THEREOF

CROSS-REFERENCE TO RELATED APPLICATIONS

The present applications claims priority from and is a continuation-in-part from PCT Application Serial No. PCT/CN2021/075533, filed, Feb. 5, 2021, which claims priority to Chinese Patent Application No. 202010414327.9, filed with the Chinese Patent Office on May 15, 2020, entitled "Gas Generant Composition, Preparation Method Therefor, and Use Thereof", all which are incorporated herein by reference in their entireties.

BACKGROUND

The present disclosure relates to a gas generant composition, a preparation method therefor, and use thereof and pertains to the technical field of gas generators for vehicle airbags.

A gas generant for a vehicle airbag is loaded into a gas generator as a gas generating agent and is triggered when necessary to generate a lot of gas. An airbag consists of a gas generator and an inflatable bag. Generally, when a collision exceeds the preset intensity, the gas generator is activated and triggered to start combusting the internal gas generant to generate a gas to inflate the inflatable bag, so that a cushioning air cushion is formed between the interior trim and a human body to protect the human body from injury.

At the early stage, the gas generant is mainly formulated as a sodium azide type of gas generant. This formulation has many advantages such as allowing stable combustion, a low combustion temperature, easy ignition, low internal pressure, high gas production rate, and less residues. However, it is now rarely used in vehicle airbags due to environmental protection and human health and safety issues.

Currently, the prevailing gas generants in the world are guanidine nitrate and basic copper nitrate based gas generants, in which guanidine nitrate is used as a main fuel and basic copper nitrate is used as a main oxidizer. This type of gas generants generally has a high combustion temperature. Molten copper metal is mainly generated from the basic copper nitrate after combustion and usually should be filtered and cooled by a multilayered metal filter so as to be left inside the generator. On the one hand, the increase in the weight of the metal filter leads to an increase in the cost and in the weight of the generator. On the other hand, even if a multilayered filter is used, not all the residues can be filtered, and a few residues may pass through the filter and burn the inflatable bag and may burn a human body in a more severe case.

Therefore, this problem is generally solved by means of: (1) reducing the amount of basic copper nitrate used, thereby reducing molten copper residues formed after combustion of the gas generant composition; and (2) adding a form-retaining agent to the composition formulation. The form-retaining agent is generally a high-melting substance, which serves to increase the viscosity of the molten residues and to maintain its own shape as a tablet matrix.

Strontium titanate is a high-melting metal compound. It has also been used previously in the field of gas generants for airbags. For example, Patent CN105801326A is directed to a gas generant formulation mainly containing guanidine nitrate, basic copper nitrate, and a titanate. However, the titanate used as a form-retaining agent in this patent does not have a remarkable form-retaining effect and fails to achieve a good form-retaining effect in combustion and cannot achieve a good form-retaining effect in combustion especially for a gas generant comprising more than 40% of basic copper nitrate and more than 40% of guanidine nitrate. Moreover, this gas generant formulation is less easily ignited.

For example, Patent CN100376515C discloses a gas generating composition, comprising guanidine nitrate, basic copper nitrate, auxiliary oxidizers (sodium nitrate, copper oxide, and iron oxide), and ignition improvers (aluminum oxide, copper chloride, copper chromate, and potassium chromate). The use of ignition improvers allows easier ignition of the gas generating composition with a short ignition delay period. However, aluminum oxide is generally used for agglomeration of residues and has little effect on ignition improvement; copper chloride is a weak oxidizer and has a little effect on ignition improvement; copper chromate and potassium chromate are both strong copper-containing oxidizers, can play a certain role in ignition improvement, but will increase the residue content. Copper chromate increases the content of insoluble residues. Potassium chromate increases the content of soluble residues, and soluble aerosol particles will be formed by combustion of substances containing alkali metal potassium, which are unfavorable for agglomeration of residues.

For another example, U.S. Pat. No. 5,827,996A discloses a gas generating agent for an air bag, comprising an azole or its metal salt as a fuel, an oxidizing agent, a burning catalyst, a burning control agent, and a slagging agent, wherein an azole and a metal salt are used as the fuel, and the slagging agent is an additive which solidifies the residue of the combustion of the gas generating agent, and thereby facilitates the removal of the residue by the filter in the air bag. However, this patent is applicable to formulations using azoles as fuels. This type of formulations has a much higher combustion temperature than that of the formulations of the type comprising guanidine nitrate and basic copper nitrate and cannot be retained in a good tablet form even if slagging agents are added.

In addition, Patent CN101952227B discloses a method for making a gas generant, by adding guanidine nitrate, basic copper nitrate, an auxiliary oxidizer (e.g., potassium nitrate, strontium nitrate, and sodium nitrate), a burning rate regulator (potassium perchlorate), a slag promoting agent (silicon dioxide, zinc oxide, ammonium oxide, aluminum oxide), and a tableting demolding adjuvant used also as a form-retaining synergistic adjuvant B (graphite, molybdenum disulfide, tungsten disulfide, boron nitride). The granulation method used in this patent is spray granulation, which requires higher energy consumption than wet granulation. Furthermore, the slag promoting agent used in this patent is mainly selected from metal oxides, such as silicon dioxide, aluminum oxide, zinc oxide, and cerium oxide. Metal oxides can play a certain role in promoting slag agglomeration as slag promoting agents, but are not remarkably effective in retaining the forms of tablets.

A prior patent application with patent CN107698415A discloses a gas generant consisting of guanidine nitrate, basic copper nitrate, strontium nitrate, ammonium perchlorate, strontium titanate, and talc. Strontium titanate added in this patent application has a slag-forming effect, but does not show a significant slag-forming effect in a BCN/GN-based formulation. In practical use, its slag-forming effect is found to fail to meet the requirements. Moreover, a large number of tests have shown that such tablets, after being combusted, have poor density, are easily broken when touched by hand, and will tend to fly out of the generator filter and fall into the airbag and may burn through the inflatable bag and cause potential danger to a human body.

In addition, when the airbag is in operation, the gas generating agent will burn to produce a large amount of gas to fill the inflatable bag to protect the passengers. The main components of the large amount of gas generated after the gas generating agent are burned are $N_2$, $CO_2$, $H_2O$, in which $NO_x$, $Cl_2$, HCl, CO, $NH_3$ and other toxic and harmful gases will also be produced. These toxic and harmful gases are harmful to the occupants in the vehicle, and these toxic and harmful gases will also pollute the environment.

Moreover, when the airbag is in operation, a large amount of suspended matter will be generated when the gas generating agent is burned. The suspended matter in the air will cause harm to the human body after being inhaled and also cause pollution to the environment.

Although some gas generating agent manufacturers in the world have adopted the GN/BCN formulation system, the non-toxic and harmless gas produced after the formulation is burned is one of the key indicators that mark the level of this type of formulation. In order to make the gas effluent produced by the combustion in the gas generator non-toxic and harmless, and meanwhile to meet the USCAR limit requirements for the content of toxic and harmful gases and the content of suspended matter in the air, it is necessary to adjust the components and proportions of the formulation and improve the design for the generator to make the gas generator achieve more excellent performance. Therefore, it is important to know how to adjust the composition and ratio of the gas generant formulation so that both the toxic and harmful gas content and the suspended matter content in the air generated during combustion meet the USCAR limit requirements for the toxic and harmful gas content and the suspended matter content in the air.

SUMMARY

An object of the present disclosure is to overcome the above-mentioned shortcomings of the prior art and provide a gas generant composition, in which zirconate, silicate, or a mixture of zirconate and silicate is used as a slag-forming agent in combination with other components, so that the tablets, after being combusted, can coagulate and agglomerate in a filter and retain their pre-combustion form very well, thereby completely avoiding burning of the inflatable bag due to melting and splashing of the combusted tablets. In this way, slag formation during combustion of the gas generant composition is increased by at least 50%.

Another object of the present disclosure is to provide a method for improving the slag-forming ability of a gas generant composition. The method includes introducing, as slagging agent components, zirconate and silicate which are high-melting substances into a gas generant composition comprising basic copper nitrate, guanidine nitrate, strontium nitrate, and AP.

A further object of the present disclosure is to provide a method for preparing a gas generant composition and its use.

Another object of the present disclosure is to overcome the above-mentioned shortcomings of the prior art and provide a gas generant composition, which removes the auxiliary oxidizer strontium nitrate commonly used in the prior art from the formulation, and adjusts the content ratio of the remaining components in the formulation to adjust the oxygen balance of the formulation, so that the contents of the toxic and harmful gases generated when the gas generant composition is burnt are all meet the limit requirements of the USCAR and AK-LV for the toxic and harmful gas content.

Another object of the present disclosure is to provide a method for reducing the suspended matter in the air generated after the combustion of the gas generant composition. Through the research on the specific types of the slagging agent, and the use of a suitable slagging agent in the formulation, the morphology of the residues after the generator is detonated can be effectively maintained, thereby reducing the concentration of suspended matter in the air after the combustion of the gas generating agent.

The above-mentioned objects of the present disclosure are mainly achieved by the following technical solutions.

A gas generant composition comprises guanidine nitrate, basic copper nitrate, strontium nitrate, and ammonium perchlorate and is characterized by further comprising a slag-forming agent and a lubricant, wherein the slag-forming agent is at least one zirconate, or at least one silicate, or a mixture of at least one zirconate and at least one silicate.

The contents, in percent by mass, of the respective components are as follows: guanidine nitrate at about 40% to 55%; basic copper nitrate at about 25% to 45%; strontium nitrate at about 1% to 8%; ammonium perchlorate at about 1% to 7%; slag-forming agent at about 1% to 10%; lubricant at about 0.5% to 5%.

In the gas generant composition described above, the zirconate is one or a combination of strontium zirconate, barium zirconate, or calcium zirconate.

In the gas generant composition described above, the silicate is one or a combination of zirconium silicate or calcium silicate.

In the gas generant composition described above, the slag-forming agent is a mixture of at least one zirconate and at least one silicate, in which the mass ratio of zirconate to silicate is 1:0.5-3, preferably 1:0.8-2.

In the gas generant composition described above, the slag-forming agent is a mixture of strontium zirconate, zirconium silicate, and calcium silicate in a mass ratio of 1:0.2-1.5:0.3-1.5, preferably 1:0.3-1:0.5-1.

In the gas generant composition described above, the slag-forming agent is a mixture of strontium zirconate and barium zirconate in a mass ratio of 1:0.5-3, preferably 1:0.8-2.

In the gas generant composition described above, the lubricant is one or a combination of talc, graphite, calcium stearate, magnesium stearate, molybdenum disulfide, or boron nitride.

In the gas generant composition described above, the ammonium perchlorate has a particle size D90 not greater than 20 μm; and the slag-forming agent has a particle size D90 not greater than 5 μm.

In the gas generant composition described above, the basic copper nitrate and the lubricant each have a particle size D90 not greater than 5 μm.

In the gas generant composition described above, a sum of water contents in the respective components of the gas generant composition is not more than 1% of the total mass of the respective components.

In the gas generant composition described above, the gas generant composition is molded as a circular or elliptical sheet structure, a circular or elliptical columnar structure, a special-shaped sheet or columnar structure, a circular or elliptical monoporous structure, a circular or elliptical porous structure, or a special-shaped monoporous or porous structure.

In the gas generant composition described above, the circular sheet structure has a diameter of 3 to 15 mm and a height of 2 to 5 mm; the circular columnar structure has a diameter of 3 to 15 mm and a height of 5 to 15 mm; the circular monoporous structure has an inner diameter of 0.5 to 2.5 mm, an outer diameter of 3 to 15 mm, and a height of 3 to 15 mm; and the elliptical monoporous structure has an inner diameter of 0.5 to 2.5 mm, a major diameter of 3 to 20 mm, a minor diameter of 2 to 12 mm, and a height of 3 to 15 mm.

In a method for preparing the gas generant composition described above, the gas generant composition is prepared by wet granulation, spray granulation, or dry granulation. A specific preparation method for the wet granulation comprises the steps of: (1) mixing guanidine nitrate, basic copper nitrate, strontium nitrate, ammonium perchlorate, and a slag-forming agent to obtain a first material; (2) performing wet mixing on the first material by adding water to obtain a second material, where the amount of water added is 5% to 15% of the total mass of the first material; (3) making the second material pass through a sieve of 10 to 40 meshes to obtain a third material; (4) drying the third material to a water content less than 0.5% of the total mass of the third material, and making the third material pass through the sieve of 10 to 40 meshes again to obtain a fourth material; and (5) adding a lubricant to the fourth material and molding the material.

In the method for preparing the gas generant composition described above, in the step (1), the first material is obtained by mixing guanidine nitrate, basic copper nitrate, strontium nitrate, ammonium perchlorate, and a slag-forming agent in a mixing device for a mixing duration larger than or equal to 5 min.

In the method for preparing the gas generant composition described above, the wet mixing in the step (2) is performed for a duration of 20 min to 60 min; and the wet mixing is performed by a device selected from a kneader or a mixer.

In a method for preparing the gas generant composition described above, the gas generant composition is prepared by wet granulation, and the specific preparation method comprises the steps of: (1) mixing guanidine nitrate, basic copper nitrate, strontium nitrate, ammonium perchlorate, a slag-forming agent, and a lubricant to obtain a first material; (2) performing wet mixing on the first material by adding water to obtain a second material, where the amount of water added is 5% to 15% of the total mass of the first material; (3) making the second material pass through a sieve of 10 to 40 meshes to obtain a third material; (4) drying the third material to a water content less than 0.5% of the total mass of the third material, and making the third material pass through the sieve of 10 to 40 meshes again to obtain a fourth material; and (5) molding the fourth material.

In the method for preparing the gas generant composition described above, in the step (1), the first material is obtained by mixing guanidine nitrate, basic copper nitrate, strontium nitrate, ammonium perchlorate, a slag-forming agent, and a lubricant in a mixing device for a mixing duration larger than or equal to 5 min.

In the method for preparing the gas generant composition described above, the wet mixing in the step (2) is performed for a duration of 20 min to 60 min; and the wet mixing is performed by a device selected from a kneader or a mixer.

In use of the gas generant composition described above, the gas generant composition is used in a gas generator for a vehicle airbag.

A gas generator uses the gas generant composition described above.

A gas generant composition comprises guanidine nitrate, basic copper nitrate and ammonium perchlorate and is characterized by further comprising a slag-forming agent and a lubricant, wherein the slag-forming agent is at least one zirconate, or at least one silicate, or a mixture of at least one zirconate and at least one silicate.

The contents, in percent by mass, of the respective components are as follows: guanidine nitrate at about 40% to 60%; basic copper nitrate at about 25% to 50%; ammonium perchlorate at about 0% to 7%; slag-forming agent at about 1% to 10%; and lubricant at about 0.05% to 5%.

In the gas generant composition described above, the zirconate is one or a combination of strontium zirconate, barium zirconate, or calcium zirconate.

In the gas generant composition described above, the zirconate is barium zirconate.

In the gas generant composition described above, the silicate is one or a combination of zirconium silicate or calcium silicate.

In the gas generant composition described above, the slag-forming agent is a mixture of at least one zirconate and at least one silicate, in which the mass ratio of zirconate to silicate is 1:0.5-3, preferably 1:0.8-2.

In the gas generant composition described above, the slag-forming agent is a mixture of strontium zirconate, zirconium silicate, and calcium silicate in a mass ratio of 1:0.2-1.5:0.3-1.5, preferably 1:0.3-1:0.5-1.

In the gas generant composition described above, the slag-forming agent is a mixture of strontium zirconate and barium zirconate in a mass ratio of 1:0.5-3, preferably 1:0.8-2.

In the gas generant composition described above, the lubricant is one or a combination of talc, graphite, calcium stearate, magnesium stearate, molybdenum disulfide, or boron nitride.

In the gas generant composition described above, the ammonium perchlorate has a particle size D90 not greater than 20 μm; and the slag-forming agent has a particle size D90 not greater than 5 μm.

In the gas generant composition described above, the basic copper nitrate and the lubricant each have a particle size D90 not greater than 5 μm.

In the gas generant composition described above, the basic copper nitrate has a specific surface area of 1.0-8.0 $m^2/g$, preferably 2.0-6.0 $m^2/g$.

In the gas generant composition described above, a sum of water contents in the respective components of the gas generant composition is not more than 1% of the total mass of the respective components.

In the gas generant composition described above, the gas generant composition is molded as a circular or elliptical sheet structure, a circular or elliptical columnar structure, a special-shaped sheet or columnar structure, a circular or elliptical monoporous structure, a circular or elliptical porous structure, or a special-shaped monoporous or porous structure.

In the gas generant composition described above, the circular sheet structure has a diameter of 3 to 15 mm and a height of 2 to 5 mm; the circular columnar structure has a diameter of 3 to 15 mm and a height of 5 to 15 mm; the circular monoporous structure has an inner diameter of 0.5 to 2.5 mm, an outer diameter of 3 to 15 mm, and a height of 3 to 15 mm; and the elliptical monoporous structure has an inner diameter of 0.5 to 2.5 mm, a major diameter of 3 to 20 mm, a minor diameter of 2 to 12 mm, and a height of 3 to 15 mm.

In a method for preparing the gas generant composition described above, the gas generant composition is prepared by wet granulation, spray granulation, or dry granulation. A specific preparation method for the wet granulation comprises the steps of: (1) mixing guanidine nitrate, basic copper nitrate, ammonium perchlorate, and a slag-forming agent to obtain a first material; (2) performing wet mixing on the first material by adding water to obtain a second material, where the amount of water added is 5% to 15% of the total mass of the first material; (3) making the second material pass through a sieve of 10 to 40 meshes to obtain a third material; (4) drying the third material to a water content less than 0.5% of the total mass of the third material, and making the third material pass through the sieve of 10 to 40 meshes again to obtain a fourth material; and (5) adding a lubricant to the fourth material and molding the material.

In the method for preparing the gas generant composition described above, in the step (1), the first material is obtained by mixing guanidine nitrate, basic copper nitrate, ammonium perchlorate, and a slag-forming agent in a mixing device for a mixing duration larger than or equal to 5 min.

In the method for preparing the gas generant composition described above, the wet mixing in the step (2) is performed for a duration of 20 min to 60 min; and the wet mixing is performed by a device selected from a kneader or a mixer.

In a method for preparing the gas generant composition described above, the gas generant composition is prepared by wet granulation, and the specific preparation method comprises the steps of: (1) mixing guanidine nitrate, basic copper nitrate, ammonium perchlorate, a slag-forming agent, and a lubricant to obtain a first material; (2) performing wet mixing on the first material by adding water to obtain a second material, where the amount of water added is 5% to 15% of the total mass of the first material; (3) making the second material pass through a sieve of 10 to 40 meshes to obtain a third material; (4) drying the third material to a water content less than 0.5% of the total mass of the third material, and making the third material pass through the sieve of 10 to 40 meshes again to obtain a fourth material; and (5) molding the fourth material.

In the method for preparing the gas generant composition described above, in the step (1), the first material is obtained by mixing guanidine nitrate, basic copper nitrate, ammonium perchlorate, a slag-forming agent, and a lubricant in a mixing device for a mixing duration larger than or equal to 5 min.

In the method for preparing the gas generant composition described above, the wet mixing in the step (2) is performed for a duration of 20 min to 60 min; and the wet mixing is performed by a device selected from a kneader or a mixer.

In use of the gas generant composition described above, the gas generant composition is used in a gas generator for a vehicle airbag.

A gas generator uses the gas generant composition described above.

Compared with the prior art, the present disclosure has the following advantageous effects.

(1) In the present disclosure, zirconate, silicate, or a mixture of zirconate and silicate is used for the first time as a slag-forming agent of a gas generant and combined with guanidine nitrate, basic copper nitrate, strontium nitrate, ammonium perchlorate, and a release agent, so that the tablets can retain their form before combustion very well after being combusted, thereby completely avoiding burning of the inflatable bag due to melting and splashing of the combusted tablets and significantly reducing molten copper residues formed after the combustion and decomposition of basic copper nitrate. The low-temperature ignition performance of the composition is significantly improved while the combustion speed is increased, and slag formation during the combustion of the gas generant composition is increased by at least 50%.

(2) In the gas generant formulation based on basic copper nitrate and guanidine nitrate according to the present disclosure, zirconate, silicate, or a mixture of zirconate and silicate is added for the first time as a slag-forming agent of the gas generant, so that molten copper metal can be coagulated and agglomerated into lumps. The slag-forming agent has a melting point about 2,500 K. The slag-forming agent is less combustible and can gather all the solid combustion products and agglomerates together during combustion of the gas generant composition, so that the gas generant retains its original shape after being combusted. A large number of tests have shown that zirconate, silicate, or a mixture thereof used in the present disclosure can create a good effect of coagulating a metallic copper melt formed after the decomposition of basic copper nitrate, to further reduce molten copper residues, and can serve to increase the viscosity of the molten residues and to maintain its own shape as a tablet matrix, thereby obtaining significant agglomeration and slagging effects.

(3) In the present disclosure, zirconate, silicate, or a mixture of zirconate and silicate is used for the first time as a slag-forming agent of a gas generant, so that slag formation during the combustion of the gas generant composition is increased by at least 50% while ensuring an unaltered rate of combustion of the gas generant. After the generator has undergone a TANKWASH residue test, the total content of insoluble substances and water-soluble substances is far less than 1 g (as required in industry by USCAR) and is about 0.4 g.

(4) In the present disclosure, a certain amount of ammonium perchlorate and strontium nitrate are used as auxiliary oxidizers in combination with other individual components, and zirconate, silicate, or a mixture of zirconate and silicate is added as a slag-forming agent of the gas generant, so that the composition has an improved low-temperature ignition performance and an increased combustion speed and meets the requirements of USCAR standards.

(5) In the present disclosure, the process procedures and process conditions of wet granulation are designed optimally, so that the preparation process is simple and easily implementable. Moreover, the release agent in the preparation method according to the present disclosure may be mixed with other components prior to preparation and then wet preparation may be performed, or talc may be added at the end, so that the preparation method is carried out more flexibly.

(6) When the gas generating agent is further optimized, strontium nitrate is removed from the formulation, and the ratio of the remaining components (guanidine nitrate, basic copper nitrate, ammonium perchlorate, slag-forming agent and lubricant) is further optimized. In addition to the beneficial technical effects listed in (1)-(5) above, the prepared gas generating agent can further achieve the following beneficial technical effects: the oxygen balance of the gas generating agent is adjusted, so that the content of toxic and harmful gases (including $NO_x$, $Cl_2$, HCl, CO, $NH_3$, etc.) generated when the gas generating agent is burned meets USCAR limit requirements for toxic and harmful gas content.

(7) Further, after researching and selecting the slagging agent, it is found that when the appropriate slagging agent is selected to match the remaining components in the gas generating agent formulation, the morphology of the residues after the generator is detonated remains relatively intact, thereby effectively reducing the concentration of suspended matter in the air after the combustion of the gas generating agent, thereby meeting the USCAR requirements for suspended matter in the air.

DETAILED DESCRIPTION OF THE EMBODIMENTS

Figure 1:
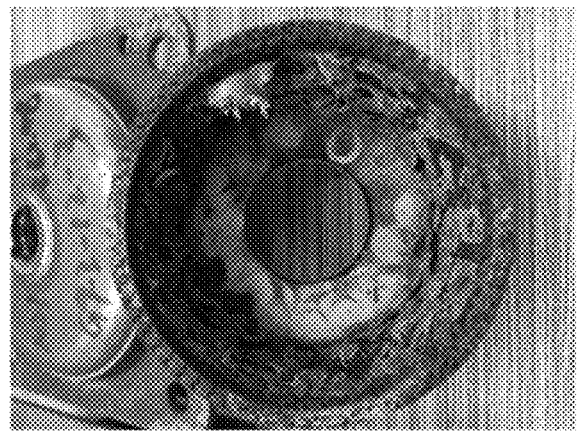
FIG. 1 is a picture showing the morphology of residues obtained after combustion of gas generant composition tablets in Comparative Example 1 of the present disclosure.

The present disclosure will be described in further detail below with reference to the accompanying drawings and specific examples.

Recitation of ranges of values herein are merely intended to serve as a shorthand method of referring individually to each separate value falling within the range, unless otherwise indicated herein, and each separate value is incorporated into the specification as if it were individually recited herein. The word "about," when accompanying a numerical value, is to be construed as indicating a deviation of up to and inclusive of 10% from the stated numerical value. The use of any and all examples, or exemplary language ("e.g." or "such as") provided herein, is intended merely to better illuminate the invention and does not pose a limitation on the scope of the invention unless otherwise claimed. No language in the specification should be construed as indicating any nonclaimed element as essential to the practice of the invention.

The present disclosure discloses a gas generant composition, comprising guanidine nitrate, basic copper nitrate, strontium nitrate, ammonium perchlorate, a slag-forming agent, and a lubricant, wherein the slag-forming agent is at least one zirconate, or at least one silicate, or a mixture of at least one zirconate and at least one silicate, and the lubricant is selected from at least one of talc, graphite, calcium stearate, magnesium stearate, molybdenum disulfide, or boron nitride.

The contents, in percent by mass, of the respective components are as follows: guanidine nitrate at about 40% to 55%; basic copper nitrate at about 25% to 45%; strontium nitrate at about 1% to 8%; ammonium perchlorate at about 1% to 7%; slag-forming agent at about 1% to 10%; lubricant at about 0.5% to 5%.

The above-mentioned zirconate is one or a combination of strontium zirconate, barium zirconate, or calcium zirconate.

The above-mentioned silicate is one or a combination of zirconium silicate or calcium silicate.

The above-mentioned slag-forming agent is a mixture of at least one zirconate and at least one silicate, in which the mass ratio of zirconate to silicate is 1:0.5-3.

In an optional embodiment of the present disclosure, the slag-forming agent is a mixture of strontium zirconate, zirconium silicate, and calcium silicate in a mass ratio of 1:0.5-3:0.5-3.

In an optional embodiment of the present disclosure, the slag-forming agent is a mixture of strontium zirconate and barium zirconate in a mass ratio of 1:0.5-3.

The above-mentioned ammonium perchlorate has a particle size D90 not greater than 20 μm.

The above-mentioned slag-forming agent has a particle size D90 not greater than 5 μm.

The above-mentioned basic copper nitrate and the lubricant/release agent each have a particle size D90 not greater than 5 μm.

A sum of water contents in the respective components of the gas generant composition described above is not more than 1% of the total mass of the respective components.

In an optional embodiment of the present disclosure, the gas generant composition is molded as a circular or elliptical sheet structure, a circular or elliptical columnar (or cylindrical) structure, a special-shaped sheet or columnar structure, a circular or elliptical monoporous structure, a circular or elliptical porous structure, or a special-shaped monoporous or porous structure. Here, the circular sheet structure has a diameter of 3 to 15 mm and a height of 2 to 5 mm; the circular columnar structure has a diameter of 3 to 15 mm and a height of 5 to 15 mm; the circular monoporous structure has an inner diameter of 0.5 to 2.5 mm, an outer diameter of 3 to 15 mm, and a height of 3 to 15 mm; and the elliptical monoporous structure has an inner diameter of 0.5 to 2.5 mm, a major diameter of 3 to 20 mm, a minor diameter of 2 to 12 mm, and a height of 3 to 15 mm.

A method for preparing a gas generant composition according to the present disclosure may be carried out by a method comprising wet granulation, spray granulation, or dry granulation. Here, spray granulation or dry granulation may be carried out by using a traditional granulation process method.

Here, a specific preparation method for wet granulation includes the following steps.

(1) Guanidine nitrate, basic copper nitrate, strontium nitrate, ammonium perchlorate, and a slag-forming agent are mixed to obtain a first material, where they are mixed in a mixing device for a mixing duration larger than or equal to 5 min. The mixing device may be a pneumatic mixer, a V-type mixer, a three-dimensional multi-directional motion mixer, an automatic lifting hopper mixer, a vibration mill, a ribbon mixer, or an acoustic resonance mixer.

(2) The first material is subjected to wet mixing with addition of water to obtain a second material, where the wet mixing is performed for a duration of 20 min to 60 min, wherein the amount of water added is 5% to 15% of the total mass of the first material, and distilled water is preferably added. The device for wet mixing is a kneader or a mixer and may, for example, be selected from a horizontal kneader, a vertical kneader, a ribbon mixer, or an acoustic resonance mixer.

(3) The second material is caused to pass through a sieve having 10 to 40 meshes to obtain a third material.

(4) The third material is dried to a water content less than 0.5% of the total mass of the third material and is caused to pass through the sieve (screen) having 10 to 40 meshes again to obtain a fourth material. The drying device may be an electric heating oven, an oil bath oven, a steam oven, a double-cone oven, a vibrating fluidized bed, or a belt vacuum dryer.

(5) A lubricant is added to the fourth material and the material is molded. The molding device may be a hydraulic press, a rotary tablet press, or a powder molding machine. It may be molded as a circular or elliptical sheet structure, a circular or elliptical columnar structure, a special-shaped sheet or columnar structure, a circular or elliptical monoporous structure, a circular or elliptical porous structure, or a special-shaped monoporous or porous structure. In an optional embodiment of the present disclosure, the circular sheet structure has a diameter of 3 to 15 mm and a height of 2 to 5 mm; the circular columnar structure has a diameter of 3 to 15 mm and a height of 5 to 15 mm; the circular monoporous structure has an inner diameter of 0.5 to 2.5 mm, an outer diameter of 3 to 15 mm, and a height of 3 to 15 mm; and the elliptical monoporous structure has an inner diameter of 0.5 to 2.5 mm, a major diameter of 3 to 20 mm, a minor diameter of 2 to 12 mm, and a height of 3 to 15 mm.

Another specific preparation method for wet granulation includes the following steps.

(1) Guanidine nitrate, basic copper nitrate, strontium nitrate, ammonium perchlorate, a slag-forming agent, and a lubricant are mixed to obtain a first material, where they are mixed in a mixing device for a mixing duration larger than or equal to 5 min. The mixing device may be a V-type mixer, a three-dimensional multi-directional motion mixer, an automatic lifting hopper mixer, a vibration mill, a ribbon mixer, or an acoustic resonance mixer.

(2) The first material is subjected to wet mixing with addition of water to obtain a second material, where the wet mixing is performed for a duration of 20 min to 60 min, wherein the amount of water added is 5% to 15% of the total mass of the first material, and distilled water is preferably added. The device for wet mixing is a kneader or a mixer and may, for example, be selected from a horizontal kneader, a vertical kneader, a ribbon mixer, or an acoustic resonance mixer.

(3) The second material is caused to pass through a sieve having 10 to 40 meshes to obtain a third material.

(4) The third material is dried to a water content less than 0.5% of the total mass of the third material and is caused to pass through the sieve having 10 to 40 meshes again to obtain a fourth material. The drying device may be an electric heating oven, an oil bath oven, a steam oven, a double-cone oven, a vibrating fluidized bed, or a belt vacuum dryer.

(5) The fourth material is molded. The molding device may be a hydraulic press, a rotary tablet press, or a powder molding machine.

The above-mentioned gas generant composition of the present disclosure is used in a gas generator of a vehicle airbag.

In the gas generant formulation based on basic copper nitrate and guanidine nitrate according to the present disclosure, zirconate, silicate, or a mixture of zirconate and silicate is added for the first time as a slag-forming agent of the gas generant, so that molten copper metal can be coagulated and agglomerated into lumps. The slag-forming agent has a melting point about 2,500 K, which is much higher than the melting point of metallic copper. A large number of tests have shown that the slag-forming agent is less combustible and can gather all the solid combustion products and agglomerates together during combustion of the gas generant composition, so that the gas generant retains its original shape after being combusted. Zirconate, silicate, or a mixture thereof used in the present disclosure can create a good effect of coagulating a metallic copper melt formed after the decomposition of basic copper nitrate, to further reduce molten copper residues, and can serve to increase the viscosity of the molten residues and to maintain its own shape as a tablet matrix, thereby obtaining significant agglomeration and slagging effects.

In the following examples, the mixing device used is a three-dimensional multi-directional motion mixer (or an ultra-efficient mixer), the kneader used is a horizontal kneader, the drying device used is a vacuum oven, and the molding device used is a rotary tablet press.

Comparative Example 1

A gas generant composition comprised components having the following contents, in percent by mass: guanidine nitrate at about 40%; basic copper nitrate at about 40%; strontium nitrate at about 12.75%; ammonium perchlorate at about 1%; strontium titanate at about 5.5%; talc at about 0.75%.

These components were weighed and then were pressed into round tablets with a diameter of 5 mm and a thickness of 1.9 mm by wet granulation and by a rotary tablet press. The specific preparation method was carried out as follows. Guanidine nitrate, basic copper nitrate, strontium nitrate, ammonium perchlorate, and strontium titanate were mixed by a mixing device to obtain a first material; 15% of distilled water was added to the first material and the first material was subjected to wet kneading for 60 min to obtain a second material, and the second material was caused to pass through a 40-mesh sieve to obtain a third material; the third material was dried to a water content less than 0.5% of the total mass of the third material and was caused to pass through the 40-mesh sieve again to obtain a fourth material; talc was added to the fourth material, and the material was molded by a rotary tablet press.

The prepared round tablets were loaded into a test generator and subjected to an ignition and combustion test. After the test, the generator was dissected to observe the form of the combusted tablets.

FIG. 1 was a picture showing the morphology of residues obtained after combustion of the gas generant composition tablets in Comparative Example 1 of the present disclosure. Table 1 below showed statistics of the weights of soluble residues and insoluble residues discharged after the combustion of the gas generant composition tablets in Comparative Example 1 of the present disclosure and their low-temperature ignition delay time. It could be seen from FIG. 1 and Table 1 that the tablets were in the form of sheets, were tightly attached to the inner wall of the filter, had poor density, were easily broken when touched by hand, and would tend to fly out of the generator filter and fall into the airbag and might burn through the inflatable bag and cause potential danger to a human body. Their low-temperature ignition time met the requirement of being less than 7 ms.

TABLE 1

| No. | PH Value | Water-soluble Matter Weight (g) | Insoluble Matter Weight (g) | Total Weight (g) | Ignition Delay Time (ms) |
|---|---|---|---|---|---|
| 001 | 5.89 | 0.602 | 0.026 | 0.628 | 3.9 |
| 002 | 5.52 | 0.459 | 0.029 | 0.488 | 4.5 |
| 003 | 5.50 | 0.502 | 0.015 | 0.517 | 4.1 |
| AVE | 5.64 | 0.521 | 0.023 | 0.544 | 4.3 |

Example 1

A gas generant composition comprised components having the following contents, in percent by mass: guanidine nitrate at about 40%; basic copper nitrate at about 42.75%; strontium nitrate at about 8%; ammonium perchlorate at about 3%; barium zirconate at about 5.5%; talc at about 0.75%.

These components were weighed and then were pressed into round tablets with a diameter of 5 mm and a thickness of 1.9 mm by wet granulation and by a rotary tablet press. The specific preparation method was carried out as follows. Guanidine nitrate, basic copper nitrate, strontium nitrate, ammonium perchlorate, and barium zirconate were mixed by a mixing device to obtain a first material; 15% of distilled water was added to the first material and the first material was subjected to wet kneading for 60 min to obtain a second material, and the second material was caused to pass through a 40-mesh sieve to obtain a third material; the third material was dried to a water content less than 0.5% of the total mass of the third material and was caused to pass through the 40-mesh sieve again to obtain a fourth material; talc was added to the fourth material, and the material was molded by a rotary tablet press.

The prepared round tablets were loaded into a test generator and subjected to an ignition and combustion test. After the test, the generator was dissected to observe the form of the combusted tablets.

Figure 2:
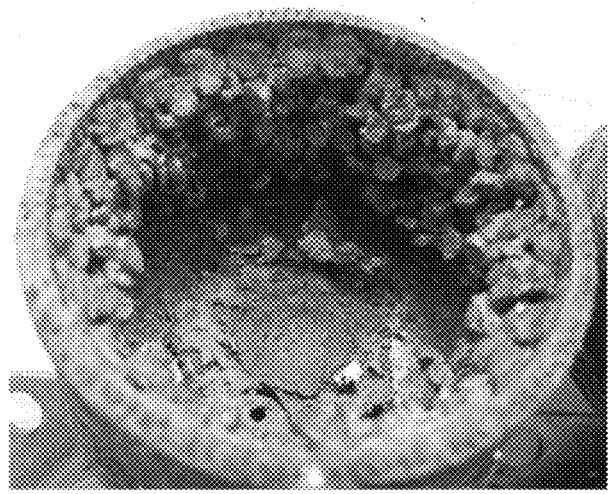
FIG. 2 is a picture showing the morphology of residues obtained after combustion of gas generant composition tablets in Example 1 of the present disclosure.

FIG. 2 was a picture showing the morphology of residues obtained after combustion of the gas generant composition tablets in Example 1 of the present disclosure. Table 2 below showed statistics of the weights of soluble residues and insoluble residues discharged after the combustion of the gas generant composition tablets in Example 1 of the present disclosure and their low-temperature ignition delay time. It could be seen from FIG. 2 and Table 2 that after combusted at high temperature, the tablets were in the form of the original tablet, were tightly attached to the inner wall of the filter, and had larger density. The tablets had retained a very good original appearance and had higher strength and higher density to support the maintaining of their original appearance. Their low-temperature ignition time met the requirement of being less than 7 ms.

TABLE 2

| No. | PH Value | Water-soluble Matter Weight (g) | Insoluble Matter Weight (g) | Total Weight (g) | Ignition Delay Time (ms) |
|---|---|---|---|---|---|
| 1 | 5.42 | 0.342 | 0.019 | 0.361 | 3.2 |
| 2 | 5.23 | 0.323 | 0.011 | 0.334 | 3.1 |

TABLE 2-continued

| No. | PH Value | Water-soluble Matter Weight (g) | Insoluble Matter Weight (g) | Total Weight (g) | Ignition Delay Time (ms) |
|---|---|---|---|---|---|
| 3 | 5.64 | 0.31 | 0.009 | 0.319 | 3.1 |
| AVE | 5.43 | 0.325 | 0.013 | 0.338 | 3.1 |

In this example, barium zirconate was added as a slag-forming agent, basic copper nitrate was used as a primary oxidizer, guanidine nitrate was used as a fuel, AP and strontium nitrate were used as auxiliary oxidizers, and talc was used as a lubricant and a release agent. The tablets retained a very good original appearance after being tested in a generator for an airbag. After a TANKWASH test was conducted, the weight of the water-soluble matter and the weight of the insoluble matter were decreased significantly. Moreover, the composition was combusted at an increased speed and had an ignition delay that met the strict requirements of USCAR.

Comparative Example 2

A gas generant composition comprised components having the following contents, in percent by mass: guanidine nitrate at about 52%; at about basic copper nitrate 44%; strontium titanate at about 4%.

These components were weighed and then were pressed into round tablets with a diameter of 5 mm and a thickness of 1.9 mm by wet granulation and by a rotary tablet press. The specific preparation method was carried out as follows. Guanidine nitrate, basic copper nitrate, and strontium titanate were mixed by a mixing device to obtain a first material; 10% of distilled water was added to the first material and the first material was subjected to wet kneading for 50 min to obtain a second material, and the second material was caused to pass through a 35-mesh sieve to obtain a third material; the third material was dried to a water content less than 0.5% of the total mass of the third material and was caused to pass through the 35-mesh sieve again to obtain a fourth material; and talc was added to the fourth material, and the material was molded (shaped) by a rotary tablet press.

The prepared round tablets were loaded into a test generator and subjected to an ignition and combustion test. After the test, the generator was dissected to observe the form of the combusted tablets.

Figure 3:
FIG. 3 is a picture showing the morphology of residues obtained after combustion of gas generant composition tablets in Comparative Example 2 of the present disclosure.

FIG. 3 was a picture showing the morphology of residues obtained after combustion of the gas generant composition tablets in Comparative Example 2 of the present disclosure. Table 3 below showed statistics of the weights of soluble residues and insoluble residues discharged after the combustion of the gas generant composition tablets in Comparative Example 2 of the present disclosure and their low-temperature ignition delay time. It could be seen from FIG. 3 and Table 3 that the tablets were in the form of sheets and partially in powder form, were tightly attached to the inner wall of the filter, had poor density, and would tend to fly out of the generator filter and fall into the airbag and might burn through the inflatable bag and cause potential danger to a human body. Their low-temperature ignition time did not meet the requirement of being less than 7 ms.

TABLE 3

| No. | PH Value | Water-soluble Matter Weight (g) | Insoluble Matter Weight (g) | Total Weight (g) | Ignition Delay Time (ms) |
|---|---|---|---|---|---|
| 1 | 5.78 | 1.012 | 0.159 | 1.171 | 11.2 |
| 2 | 5.71 | 0.997 | 0.186 | 1.183 | 15.4 |
| 3 | 5.68 | 1.022 | 0.199 | 1.221 | 16.5 |
| AVE | 5.72 | 1.010 | 0.181 | 1.192 | 14.4 |

Example 2

A gas generant composition comprised components having the following contents, in percent by mass: guanidine nitrate at about 50%; basic copper nitrate at about 41.5%; strontium nitrate at about 1.5%; ammonium perchlorate at about 2%; strontium zirconate at about 4%; talc 1%.

These components were weighed and then were pressed into round tablets with a diameter of 5 mm and a thickness of 1.9 mm by wet granulation and by a rotary tablet press. The specific preparation method was carried out as follows. Guanidine nitrate, basic copper nitrate, strontium nitrate, ammonium perchlorate, strontium zirconate, and talc were mixed by a mixing device to obtain a first material; 10% of distilled water was added to the first material and the first material was subjected to wet kneading for 50 min to obtain a second material, and the second material was caused to pass through a 35-mesh sieve to obtain a third material; the third material was dried to a water content less than 0.5% of the total mass of the third material and was caused to pass through the 35-mesh sieve again to obtain a fourth material; talc was added to the fourth material, and the material was molded by a rotary tablet press.

The prepared round tablets were loaded into a test generator and subjected to an ignition and combustion test. After the test, the generator was dissected to observe the form of the combusted tablets.

Figure 4:
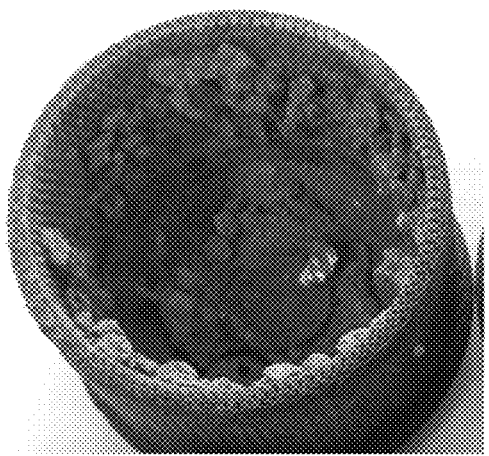
FIG. 4 is a picture showing the morphology of residues obtained after combustion of gas generant composition tablets in Example 2 of the present disclosure.

FIG. 4 was a picture showing the morphology of residues obtained after combustion of the gas generant composition tablets in Example 2 of the present disclosure. Table 4 below showed statistics of the weights of soluble residues and insoluble residues discharged after the combustion of the gas generant composition tablets in Example 2 of the present disclosure and their low-temperature ignition delay time. It could be seen from FIG. 4 and Table 4 that after combusted at high temperature, the tablets were in the form of the original tablet and exhibited a significant coagulation effect. The residues were tightly attached to the inner wall of the filter and had larger density. The tablets had retained a very good original appearance and had higher strength and higher density to support the maintaining of their original appearance. Their low-temperature ignition time met the requirement of being less than 7 ms.

TABLE 4

| No. | PH Value | Water-soluble Matter Weigh (g) | Insoluble Matter Weight (g) | Total Weight (g) | Ignition Delay Time (ms) |
|---|---|---|---|---|---|
| 1 | 5.12 | 0.321 | 0.012 | 0.333 | 2.8 |
| 2 | 5.34 | 0.213 | 0.008 | 0.221 | 2.7 |
| 3 | 5.48 | 0.216 | 0.018 | 0.234 | 2.5 |
| AVE | 5.31 | 0.250 | 0.013 | 0.263 | 2.7 |

In this example, strontium zirconate was added as a slag-forming agent, basic copper nitrate was used as a primary oxidizer, guanidine nitrate was used as a fuel, AP and strontium nitrate were used as auxiliary oxidizers, and talc was used as a lubricant and a release agent. The tablets retained a very good original appearance after being tested in a generator for an airbag. After a TANKWASH test was conducted, the weight of the water-soluble matter and the weight of the insoluble matter were decreased significantly. Moreover, the composition was combusted at an increased speed and had an ignition delay that met the strict requirements of USCAR.

Comparative Example 3

A gas generant composition comprised components having the following contents, in percent by mass: guanidine nitrate at about 45%; basic copper nitrate at about 40%; potassium perchlorate at about 5%; copper oxide at about 4%; silicon dioxide at about 5%; calcium stearate at about 1%.

These components were weighed and then were pressed into round tablets with a diameter of 5 mm and a thickness of 1.9 mm by wet granulation and by a rotary tablet press. The specific preparation method was carried out as follows. Guanidine nitrate, basic copper nitrate, copper oxide, potassium perchlorate, silicon dioxide, and calcium stearate were mixed by a mixing device to obtain a first material; 10% of distilled water was added to the first material and the first material was subjected to wet kneading for 50 min to obtain a second material, and the second material was caused to pass through a 30-mesh sieve to obtain a third material; the third material was dried to a water content less than 0.5% of the total mass of the third material and was caused to pass through the 30-mesh sieve again to obtain a fourth material; talc was added to the fourth material, and the material was molded by a rotary tablet press.

The prepared round tablets were loaded into a test generator and subjected to an ignition and combustion test. After the test, the generator was dissected to observe the form of the combusted tablets.

Figure 5:
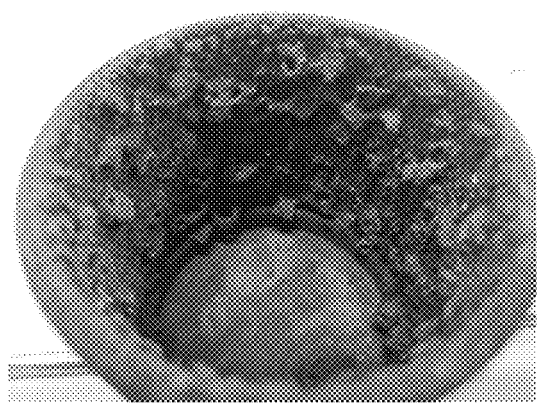
FIG. 5 is a picture showing the morphology of residues obtained after combustion of gas generant composition tablets in Comparative Example 3 of the present disclosure.

FIG. 5 was a picture showing the morphology of residues obtained after combustion of the gas generant composition tablets in Comparative Example 3 of the present disclosure. Table 5 below showed statistics of the weights of soluble residues and insoluble residues discharged after the combustion of the gas generant composition tablets in Comparative Example 3 of the present disclosure and their low-temperature ignition delay time. It could be seen from FIG. 5 and Table 5 that the tablets were agglomerated after combustion, and a large amount of metallic copper was separated out and attached to the inner wall of the filter but was not agglomerated into a desired sheet shape. As a result, the residue would tend to fly out of the generator filter and fall into the airbag and might burn through the inflatable bag and cause potential danger to a human body. Their low-temperature ignition time met the requirement of being less than 7 ms.

TABLE 5

| No. | PH Value | Water-soluble Matter Weight (g) | Insoluble Matter Weight (g) | Total Weight (g) | Ignition Delay Time (ms) |
|---|---|---|---|---|---|
| 1 | 6.02 | 1.044 | 0.238 | 1.282 | 4.5 |
| 2 | 5.98 | 1.12 | 0.356 | 1.476 | 2.3 |
| 3 | 6.12 | 1.009 | 0.297 | 1.306 | 2.8 |
| AVE | 6.04 | 1.058 | 0.297 | 1.355 | 3.2 |

Example 3

A gas generant composition comprised components having the following contents, in percent by mass: guanidine nitrate at about 45%; basic copper nitrate at about 40%; strontium nitrate at about 4%; ammonium perchlorate at about 5%; calcium zirconate at about 5%; calcium stearate at about 1%

These components were weighed and then were pressed into round tablets with a diameter of 5 mm and a thickness of 1.9 mm by wet granulation and by a rotary tablet press. The specific preparation method was carried out as follows. Guanidine nitrate, basic copper nitrate, strontium nitrate, ammonium perchlorate, calcium zirconate, and calcium stearate were mixed by a mixing device to obtain a first material; 10% of distilled water was added to the first material and the first material was subjected to wet kneading for 50 min to obtain a second material, and the second material was caused to pass through a 30-mesh sieve to obtain a third material; the third material was dried to a water content less than 0.5% of the total mass of the third material and was caused to pass through the 30-mesh sieve again to obtain a fourth material; talc was added to the fourth material, and the material was molded by a rotary tablet press.

The prepared round tablets were loaded into a test generator and subjected to an ignition and combustion test. After the test, the generator was dissected to observe the form of the combusted tablets.

Figure 6:
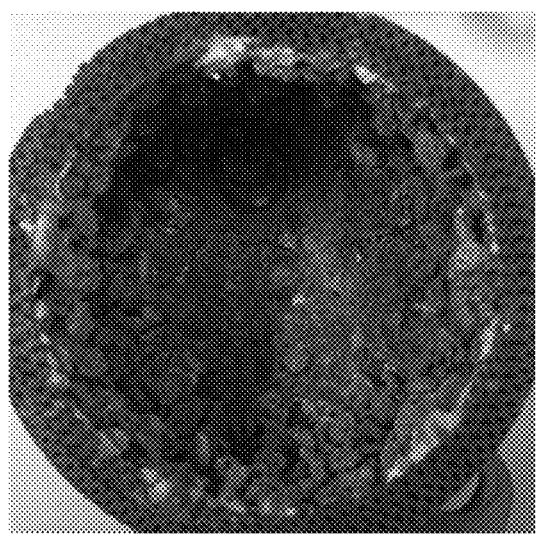
FIG. 6 is a picture showing the morphology of residues obtained after combustion of gas generant composition tablets in Example 3 of the present disclosure.

FIG. 6 was a picture showing the morphology of residues obtained after combustion of the gas generant composition tablets in Example 3 of the present disclosure. Table 6 below showed statistics of the weights of soluble residues and insoluble residues discharged after the combustion of the gas generant composition tablets in Example 3 of the present disclosure and their low-temperature ignition delay time. It could be seen from FIG. 6 and Table 6 that after combusted at high temperature, the tablets were in the form of the original tablet and exhibited a significant coagulation effect. The residues were tightly attached to the inner wall of the filter and had larger density. The tablets had retained a very good original appearance and had higher strength and higher density to support the maintaining of their original appearance. Their low-temperature ignition time met the requirement of being less than 7 ms.

TABLE 6

| No. | PH Value | Water-soluble Matter Weight (g) | Insoluble Matter Weight (g) | Total Weight (g) | Ignition Delay Time (ms) |
| --- | --- | --- | --- | --- | --- |
| 1 | 5.56 | 0.329 | 0.009 | 0.338 | 2.8 |
| 2 | 5.59 | 0.312 | 0.012 | 0.324 | 3.0 |
| 3 | 5.68 | 0.212 | 0.023 | 0.235 | 2.9 |
| AVE | 5.61 | 0.284 | 0.015 | 0.299 | 2.9 |

In this example, calcium zirconate was added as a slag-forming agent, basic copper nitrate was used as a primary oxidizer, guanidine nitrate was used as a fuel, AP and strontium nitrate were used as auxiliary oxidizers, and calcium stearate was used as a lubricant and a release agent. The tablets retained a very good original appearance after being tested in a generator for an airbag. After a TANK-WASH test was conducted, the weight of the water-soluble matter and the weight of the insoluble matter were decreased significantly. Moreover, the composition was combusted at an increased speed and had an ignition delay that met the strict requirements of USCAR.

Example 4

A gas generant composition comprised components having the following contents, in percent by mass: guanidine nitrate at about 51.5%; basic copper nitrate at about 35%; strontium nitrate at about 6%; ammonium perchlorate at about 3%; strontium zirconate at about 2%; barium zirconate at about 2%; magnesium stearate at about 0.5%.

These components were weighed and then were pressed into round tablets with a diameter of 5 mm and a thickness of 1.9 mm by wet granulation and by a rotary tablet press. The specific preparation method was carried out as follows. Guanidine nitrate, basic copper nitrate, strontium nitrate, ammonium perchlorate, strontium zirconate, barium zirconate, and magnesium stearate were mixed by a mixing device to obtain a first material; 10% of distilled water was added to the first material and the first material was subjected to wet kneading for 60 min to obtain a second material, and the second material was caused to pass through a 40-mesh sieve to obtain a third material; the third material was dried to a water content less than 0.5% of the total mass of the third material and was caused to pass through the 40-mesh sieve again to obtain a fourth material; talc was added to the fourth material, and the material was molded by a rotary tablet press.

The prepared round tablets were loaded into a test generator and subjected to an ignition and combustion test. After the test, the generator was dissected to observe the form of the combusted tablets.

Figure 7:
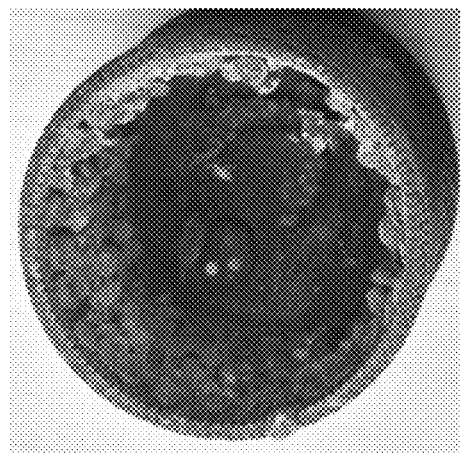
FIG. 7 is a picture showing the morphology of residues obtained after combustion of gas generant composition tablets in Example 4 of the present disclosure.

FIG. 7 was a picture showing the morphology of residues obtained after combustion of the gas generant composition tablets in Example 4 of the present disclosure. Table 7 below showed statistics of the weights of soluble residues and insoluble residues discharged after the combustion of the gas generant composition tablets in Example 4 of the present disclosure and their low-temperature ignition delay time. It could be seen from FIG. 7 and Table 7 that after combusted at high temperature, the tablets were in the form of the original tablet and exhibited a significant coagulation effect. The residues were tightly attached to the inner wall of the filter and had larger density. The tablets had retained a very good original appearance and had higher strength and higher density to support the maintaining of their original appearance. Their low-temperature ignition time met the requirement of being less than 7 ms.

TABLE 7

| No. | PH Value | Water-soluble Matter Weight (g) | Insoluble Matter Weight (g) | Total Weight (g) | Ignition Delay Time (ms) |
| --- | --- | --- | --- | --- | --- |
| 1 | 6.12 | 0.422 | 0.017 | 0.439 | 3.2 |
| 2 | 5.81 | 0.313 | 0.017 | 0.33 | 2.9 |
| 3 | 5.83 | 0.298 | 0.029 | 0.327 | 2.9 |
| AVE | 5.92 | 0.344 | 0.021 | 0.365 | 3.0 |

In this example, strontium zirconate and barium zirconate were added as a slag-forming agent, basic copper nitrate was used as a primary oxidizer, guanidine nitrate was used as a fuel, AP and strontium nitrate were used as auxiliary oxidizers, and magnesium stearate was used as a lubricant and a release agent. The tablets retained a very good original appearance after being tested in a generator for an airbag. After a TANKWASH test was conducted, the weight of the water-soluble matter and the weight of the insoluble matter were decreased significantly. Moreover, the composition was combusted at an increased speed and had an ignition delay that met the strict requirements of USCAR.

Example 5

A gas generant composition comprised components having the following contents, in percent by mass: guanidine nitrate at about 55%; basic copper nitrate at about 28%; strontium nitrate at about 4%; ammonium perchlorate at about 7%; zirconium silicate at about 4%; talc 2%.

These components were weighed and then were pressed into round tablets with a diameter of 5 mm and a thickness of 1.9 mm by wet granulation and by a rotary tablet press. The specific preparation method was carried out as follows. Guanidine nitrate, basic copper nitrate, strontium nitrate, ammonium perchlorate, zirconium silicate, and talc were mixed by a mixing device to obtain a first material; 10% of distilled water was added to the first material and the first material was subjected to wet kneading for 55 min to obtain a second material, and the second material was caused to pass through a 35-mesh sieve to obtain a third material; the third material was dried to a water content less than 0.5% of the total mass of the third material and was caused to pass through the 35-mesh sieve again to obtain a fourth material; talc was added to the fourth material, and the material was molded by a rotary tablet press.

The prepared round tablets were loaded into a test generator and subjected to an ignition and combustion test. After the test, the generator was dissected to observe the form of the combusted tablets.

Figure 8:
FIG. 8 is a picture showing the morphology of residues obtained after combustion of gas generant composition tablets in Example 5 of the present disclosure.

FIG. 8 was a picture showing the morphology of residues obtained after combustion of the gas generant composition tablets in Example 5 of the present disclosure. Table 8 below showed statistics of the weights of soluble residues and insoluble residues discharged after the combustion of the gas generant composition tablets in Example 5 of the present disclosure and their low-temperature ignition delay time. It could be seen from FIG. 8 and Table 8 that after combusted at high temperature, the tablets were in the form of the original tablet and exhibited a significant coagulation effect. The residues were tightly attached to the inner wall of the filter and had larger density. The tablets had retained a very good original appearance and had higher strength and higher density to support the maintaining of their original appearance. Their low-temperature ignition time met the requirement of being less than 7 ms.

TABLE 8

| No. | PH Value | Water-soluble Matter Weight (g) | Insoluble Matter Weight (g) | Total Weight (g) | Ignition Delay Time (ms) |
|---|---|---|---|---|---|
| 1 | 5.91 | 0.391 | 0.119 | 0.51 | 3.3 |
| 2 | 5.89 | 0.387 | 0.092 | 0.479 | 3.0 |
| 3 | 5.93 | 0.299 | 0.078 | 0.377 | 3.0 |
| AVE | 5.91 | 0.359 | 0.096 | 0.455 | 3.1 |

In this example, zirconium silicate was added as a slag-forming agent, basic copper nitrate was used as a primary oxidizer, guanidine nitrate was used as a fuel, AP and strontium nitrate were used as auxiliary oxidizers, and talc was used as a lubricant and a release agent. The tablets retained a very good original appearance after being tested in a generator for an airbag. After a TANKWASH test was conducted, the weight of the water-soluble matter and the weight of the insoluble matter were decreased significantly. Moreover, the composition was combusted at an increased speed and had an ignition delay that met the strict requirements of USCAR.

Example 6

A gas generant composition comprised components having the following contents, in percent by mass: guanidine nitrate at about 48%; basic copper nitrate at about 42%; strontium nitrate at about 2.5%; ammonium perchlorate at about 3%; strontium zirconate at about 1.5%; zirconium silicate at about 2.5%; talc at about 0.5%.

These components were weighed and then were pressed into round tablets with a diameter of 5 mm and a thickness of 1.9 mm by wet granulation and by a rotary tablet press. The specific preparation method was carried out as follows. Guanidine nitrate, basic copper nitrate, strontium nitrate, ammonium perchlorate, strontium zirconate, zirconium silicate, and talc were mixed by a mixing device to obtain a first material; 10% of distilled water was added to the first material and the first material was subjected to wet kneading for 60 min to obtain a second material, and the second material was caused to pass through a 40-mesh sieve to obtain a third material; the third material was dried to a water content less than 0.5% of the total mass of the third material and was caused to pass through the 40-mesh sieve again to obtain a fourth material; talc was added to the fourth material, and the material was molded by a rotary tablet press.

The prepared round tablets were loaded into a test generator and subjected to an ignition and combustion test. After the test, the generator was dissected to observe the form of the combusted tablets.

Figure 9:
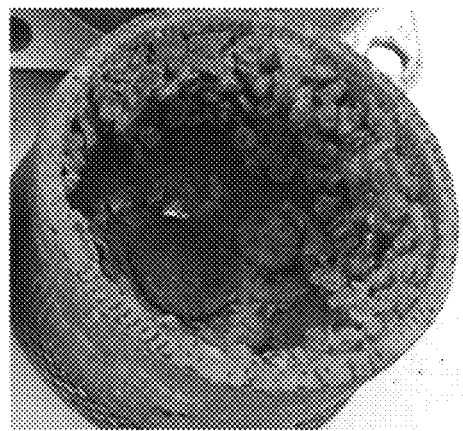
FIG. 9 is a picture showing the morphology of residues obtained after combustion of gas generant composition tablets in Example 6 of the present disclosure.

FIG. 9 was a picture showing the morphology of residues obtained after combustion of the gas generant composition tablets in Example 6 of the present disclosure. Table 9 below showed statistics of the weights of soluble residues and insoluble residues discharged after the combustion of the gas generant composition tablets in Example 6 of the present disclosure and their low-temperature ignition delay time. It could be seen from FIG. 9 and Table 9 that after combusted at high temperature, the tablets were in the form of the original tablet and exhibited a significant coagulation effect. The residues were tightly attached to the inner wall of the filter and had larger density. The tablets had retained a very good original appearance and had higher strength and higher density to support the maintaining of their original appearance. Their low-temperature ignition time met the requirement of being less than 7 ms.

TABLE 9

| No. | PH Value | Water-soluble Matter Weight (g) | Insoluble Matter Weight (g) | Total Weight (g) | Ignition Delay Time (ms) |
|---|---|---|---|---|---|
| 1 | 5.68 | 0.299 | 0.012 | 0.311 | 2.9 |
| 2 | 5.49 | 0.367 | 0.091 | 0.458 | 3.0 |
| 3 | 5.87 | 0.354 | 0.059 | 0.413 | 2.8 |
| AVE | 5.68 | 0.340 | 0.054 | 0.394 | 2.9 |

In this example, strontium zirconate and zirconium silicate were added as a slag-forming agent, basic copper nitrate was used as a primary oxidizer, guanidine nitrate was used as a fuel, AP and strontium nitrate were used as auxiliary oxidizers, and talc was used as a lubricant and a release agent. The tablets retained a very good original appearance after being tested in a generator for an airbag. After a TANKWASH test was conducted, the weight of the water-soluble matter and the weight of the insoluble matter were decreased significantly. Moreover, the composition was combusted at an increased speed and had an ignition delay that met the strict requirements of USCAR.

In each of the above-mentioned Comparative Examples and Examples of the present disclosure, three parallel tests were conducted and an average value was obtained therefrom.

The present disclosure further provides a gas generant composition, comprising guanidine nitrate, basic copper nitrate and ammonium perchlorate and characterized by further comprising a slag-forming agent and a lubricant, wherein the slag-forming agent (slagging agent) is at least one zirconate, or at least one silicate, or a mixture of at least one zirconate and at least one silicate.

The contents, in percent by mass, of the respective components are as follows: guanidine nitrate at about 40% to 60%; basic copper nitrate at about 25% to 50%; ammonium perchlorate at about 0% to 7%; slag-forming agent at about 1% to 10%; and lubricant at about 0.05% to 5%.

In the gas generant composition described above, mass percentage of the guanidine nitrate may be, but is not limited to, 40%, 41%, 42%, 43%, 44%, 45%, 46%, 47%, 48%, 49%, 50%, 51%, 52%, 53%, 54%, 55%, 56%, 57%, 58%, 59% and 60%.

In the gas generant composition described above, mass percentage of the basic copper nitrate may be, but is not limited to, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49% and 50%.

In the gas generant composition described above, mass percentage of the ammonium perchlorate may be, but is not limited to, 0%, 0.5%, 1%, 2%, 3%, 4%, 5%, 6% and 7%.

In the gas generant composition described above, mass percentage of the slag-forming agent may be, but is not limited to, 1%, 2%, 3%, 4%, 5%, 6%, 7%, 8%, 9% and 10%.

In the gas generant composition described above, mass percentage of the lubricant may be, but is not limited to, 0.05%, 0.5%, 1%, 2%, 3%, 4% and 5%.

In the gas generant composition described above, the zirconate is one or a combination of strontium zirconate, barium zirconate, or calcium zirconate.

In the gas generant composition described above, the zirconate is barium zirconate.

In the gas generant composition described above, the silicate is one or a combination of zirconium silicate or calcium silicate.

In the gas generant composition described above, the slag-forming agent is a mixture of at least one zirconate and at least one silicate, in which the mass ratio of zirconate to silicate is 1:0.5-3, preferably 1:0.8-2.

In the gas generant composition described above, the slag-forming agent is a mixture of strontium zirconate, zirconium silicate, and calcium silicate in a mass ratio of 1:0.2-1.5:0.3-1.5, preferably 1:0.3-1:0.5-1.

In the gas generant composition described above, the slag-forming agent is a mixture of strontium zirconate and barium zirconate in a mass ratio of 1:0.5-3, preferably 1:0.8-2.

In the gas generant composition described above, the lubricant is one or a combination of talc, graphite, calcium stearate, magnesium stearate, molybdenum disulfide, or boron nitride.

In the gas generant composition described above, the ammonium perchlorate has a particle size D90 not greater than 20 μm; and the slag-forming agent has a particle size D90 not greater than 5 μm.

In the gas generant composition described above, the basic copper nitrate and the lubricant each have a particle size D90 not greater than 5 μm.

In the gas generant composition described above, the basic copper nitrate has a specific surface area of 1.0-8.0 $m^2/g$, preferably 2.0-6.0 $m^2/g$.

In the gas generant composition described above, a sum of water contents in the respective components of the gas generant composition is not more than 1% of the total mass of the respective components.

In the gas generant composition described above, the gas generant composition is molded as a circular or elliptical sheet structure, a circular or elliptical columnar structure, a special-shaped sheet or columnar structure, a circular or elliptical monoporous structure, a circular or elliptical porous structure, or a special-shaped monoporous or porous structure.

In the gas generant composition described above, the circular sheet structure has a diameter of 3 to 15 mm and a height of 2 to 5 mm; the circular columnar structure has a diameter of 3 to 15 mm and a height of 5 to 15 mm; the circular monoporous structure has an inner diameter of 0.5 to 2.5 mm, an outer diameter of 3 to 15 mm, and a height of 3 to 15 mm; and the elliptical monoporous structure has an inner diameter of 0.5 to 2.5 mm, a major diameter of 3 to 20 mm, a minor diameter of 2 to 12 mm, and a height of 3 to 15 mm.

A method for preparing a gas generant composition according to the present disclosure may be carried out by a method comprising wet granulation, spray granulation, or dry granulation. Here, spray granulation or dry granulation may be carried out by using a traditional granulation process method.

Here, a specific preparation method for wet granulation includes the following steps.

(1) Guanidine nitrate, basic copper nitrate, ammonium perchlorate, and a slag-forming agent are mixed to obtain a first material, where they are mixed in a mixing device for a mixing duration larger than or equal to 5 min. The mixing device may be a pneumatic mixer, a V-type mixer, a three-dimensional multi-directional motion mixer, an automatic lifting hopper mixer, a vibration mill, a ribbon mixer, or an acoustic resonance mixer.

(2) The first material is subjected to wet mixing with addition of water to obtain a second material, where the wet mixing is performed for a duration of 20 min to 60 min, wherein the amount of water added is 5% to 15% of the total mass of the first material, and distilled water is preferably added. The device for wet mixing is a kneader or a mixer and may, for example, be selected from a horizontal kneader, a vertical kneader, a ribbon mixer, or an acoustic resonance mixer.

(3) The second material is caused to pass through a sieve having 10 to 40 meshes to obtain a third material.

(4) The third material is dried to a water content less than 0.5% of the total mass of the third material and is caused to pass through the sieve (screen) having 10 to 40 meshes again to obtain a fourth material. The drying device may be an electric heating oven, an oil bath oven, a steam oven, a double-cone oven, a vibrating fluidized bed, or a belt vacuum dryer.

(5) A lubricant is added to the fourth material and the material is molded. The molding device may be a hydraulic press, a rotary tablet press, or a powder molding machine. It may be molded as a circular or elliptical sheet structure, a circular or elliptical columnar structure, a special-shaped sheet or columnar structure, a circular or elliptical monoporous structure, a circular or elliptical porous structure, or a special-shaped monoporous or porous structure. In an optional embodiment of the present disclosure, the circular sheet structure has a diameter of 3 to 15 mm and a height of 2 to 5 mm; the circular columnar structure has a diameter of 3 to 15 mm and a height of 5 to 15 mm; the circular monoporous structure has an inner diameter of 0.5 to 2.5 mm, an outer diameter of 3 to 15 mm, and a height of 3 to 15 mm; and the elliptical monoporous structure has an inner diameter of 0.5 to 2.5 mm, a major diameter of 3 to 20 mm, a minor diameter of 2 to 12 mm, and a height of 3 to 15 mm.

Another specific preparation method for wet granulation includes the following steps.

(1) Guanidine nitrate, basic copper nitrate, ammonium perchlorate, a slag-forming agent, and a lubricant are mixed to obtain a first material, where they are mixed in a mixing device for a mixing duration larger than or equal to 5 min. The mixing device may be a V-type mixer, a three-dimensional multi-directional motion mixer, an automatic lifting hopper mixer, a vibration mill, a ribbon mixer, or an acoustic resonance mixer.

(2) The first material is subjected to wet mixing with addition of water to obtain a second material, where the wet mixing is performed for a duration of 20 min to 60 min, wherein the amount of water added is 5% to 15% of the total mass of the first material, and distilled water is preferably added. The device for wet mixing is a kneader or a mixer and may, for example, be selected from a horizontal kneader, a vertical kneader, a ribbon mixer, or an acoustic resonance mixer.

(3) The second material is caused to pass through a sieve having 10 to 40 meshes to obtain a third material.

(4) The third material is dried to a water content less than 0.5% of the total mass of the third material and is caused to pass through the sieve having 10 to 40 meshes again to obtain a fourth material. The drying device may be an electric heating oven, an oil bath oven, a steam oven, a double-cone oven, a vibrating fluidized bed, or a belt vacuum dryer.

(5) The fourth material is molded. The molding device may be a hydraulic press, a rotary tablet press, or a powder molding machine.

The above-mentioned gas generant composition of the present disclosure is used in a gas generator of a vehicle airbag.

In the following examples, the mixing device used is a three-dimensional multi-directional motion mixer (or an ultra-efficient mixer), the kneader used is a horizontal kneader, the drying device used is a vacuum oven, and the molding device used is a rotary tablet press.

The study found that when gas generant compositions of different formulation ratios are burned, as the oxygen balance of the gas generant composition formulation decreases, the contents of CO, NO, $NH_3$ and HCl show an increase trend, while the contents of $NO_2$ and $Cl_2$ show a decrease trend; and when the oxygen balance of the gas generant composition formulation increases, the opposite trend will appear, that is, the contents of CO, NO, $NH_3$ and HCl will show a decrease trend, while the contents of $NO_2$ and $Cl_2$ will show an increase trend.

Therefore, if the oxygen balance of the gas generant composition formulation is too high or too low, the content of at least a part of the toxic and harmful gases generated when the gas generant composition is burned will exceed the limit content specified in the USCAR, thereby failing to meet the regulations of standard USCAR and AK-LV, and cause harm to the user's body, and cause pollution to the environment.

After a lot of research, the inventor found that when the oxygen balance of the gas generant composition formulation is 0 to −3, the contents of the toxic and harmful gases (including $NO_x$, $Cl_2$, HCl, CO, $NH_3$, etc.) generated when the gas generating agent is burned can meets the limit requirements of the standard USCAR and AK-LV for the contents of toxic and harmful gases.

Therefore, in order to achieve the above oxygen balance, the inventor further optimizes the formulation of the gas generant composition. Specifically, on the basis of the foregoing formulation, strontium nitrate as an auxiliary oxidizer is discarded, and the ratios of the remaining components are optimized.

A detailed description will be given below based on specific embodiments.

Example I

A gas generant composition comprised components having the following contents, in percent by mass: guanidine nitrate 52.0%, basic copper nitrate 42.0%, ammonium perchlorate 2%, barium zirconate 3%, calcium stearate 1%.

These components were weighed and then were pressed into round tablets with a diameter of 5 mm and a thickness of 1.9 mm by wet granulation and by a rotary tablet press. The specific preparation method was carried out as follows. Guanidine nitrate, basic copper nitrate, ammonium perchlorate, and barium zirconate were mixed by a mixing device to obtain a first material; 15% of distilled water was added to the first material and the first material was subjected to wet kneading for 60 min to obtain a second material, and the second material was caused to pass through a 40-mesh sieve to obtain a third material; the third material was dried to a water content less than 0.5% of the total mass of the third material and was caused to pass through the 40-mesh sieve again to obtain a fourth material; and calcium stearate was added to the fourth material, and the material was molded by a rotary tablet press.

The oxygen balance of the gas generant composition formulation in this example is −0.353.

Example II

A gas generant composition comprised components having the following contents, in percent by mass: guanidine nitrate 52.0%, basic copper nitrate 41.0%, ammonium perchlorate 2%, barium zirconate 4%, calcium stearate 1%.

These components were weighed and then were pressed into round tablets with a diameter of 5 mm and a thickness of 1.9 mm by wet granulation and by a rotary tablet press. The specific preparation method was carried out as follows. Guanidine nitrate, basic copper nitrate, ammonium perchlorate, barium zirconate, and calcium stearate were mixed by a mixing device to obtain a first material; 10% of distilled water was added to the first material and the first material was subjected to wet kneading for 50 min to obtain a second material, and the second material was caused to pass through a 35-mesh sieve to obtain a third material; the third material was dried to a water content less than 0.5% of the total mass of the third material and was caused to pass through the 35-mesh sieve again to obtain a fourth material; calcium stearate was added to the fourth material, and the material was molded by a rotary tablet press.

The oxygen balance of the gas generant composition formulation in this example is −0.653.

Comparative Example I

A gas generant composition comprised components having the following contents, in percent by mass: guanidine nitrate 51.0%, basic copper nitrate 41.5%, strontium nitrate 2.5%, ammonium perchlorate 2%, strontium titanate 2%, talc 1%.

These components were weighed and then were pressed into round tablets with a diameter of 5 mm and a thickness of 1.9 mm by wet granulation and by a rotary tablet press. The specific preparation method was carried out as follows. Guanidine nitrate, basic copper nitrate, strontium nitrate, ammonium perchlorate, and barium zirconate were mixed by a mixing device to obtain a first material; 15% of distilled water was added to the first material and the first material was subjected to wet kneading for 60 min to obtain a second material, and the second material was caused to pass through a 40-mesh sieve to obtain a third material; the third material was dried to a water content less than 0.5% of the total mass of the third material and was caused to pass through the 40-mesh sieve again to obtain a fourth material; talc was added to the fourth material, and the material was molded by a rotary tablet press.

The oxygen balance of the gas generant composition formulation in this example is 0.704.

Experimental Example I

The prepared gas generant composition round tablets were loaded into the test generator, and the ignition and combustion test was performed, and the Fourier infrared gas analyzer was used to measure the ingredients and contents of the generated gas after combustion, which were compared with the relevant data in USCAR. See Table 10 for specific ingredients and contents and comparison results.

TABLE 10

Comparison table of gas ingredients and contents (unit: ppm)

| No. | CO | $NO_2$ | NO | $NH_3$ | $Cl_2$ | HCl |
|---|---|---|---|---|---|---|
| USCAR Limits | 115 | 1.3 | 18.8 | 12.5 | 0.25 | 1.3 |
| Example I | 84.5 | 0.69 | 10.1 | 5.53 | 0.12 | 0.33 |
| Example II | 94.8 | 1.13 | 12.36 | 9.98 | 0.15 | 0.17 |
| Comparative Example I | 36 | 11.9 | 28.2 | 0.06 | 0.16 | 0.16 |

It can be seen from the above experimental results that although in the gases generated after combustion in Comparative Example I containing strontium nitrate, contents of some gases are lower than those in the examples (such as CO and $NH_3$), the contents of nitrides rise sharply and are much higher than the contents specified in USCAR. The content of each toxic and harmful gas generated by the gas generant composition prepared in Examples I-II after combustion is far lower than the limit content given in USCAR and thus meets the standards of USCAR.

Furthermore, the inventor also found that by experimenting with different slagging agents, under the condition that the other components and contents of the formulation remain unchanged, the morphology of the residues after the generator detonation is different, and the concentration of the suspended matter in the air after the combustion of the gas generating agent is also different.

Therefore, screening the slagging agent to determine the most suitable slagging agent can keep the morphology of the residues after combustion of the prepared gas generant composition to be relatively complete; and the concentration of the resulting suspended matter in the air is far lower than the limit concentration given in USCAR, which satisfies the USCAR standards.

A detailed description will be given below based on specific embodiments.

Example III

A gas generant composition comprised components having the following contents, in percent by mass: guanidine nitrate 48.0%, basic copper nitrate 43.5%, ammonium perchlorate 2.5%, strontium titanate 3%, talc 3%.

These components were weighed and then were pressed into round tablets with a diameter of 5 mm and a thickness of 1.9 mm by wet granulation and by a rotary tablet press. The specific preparation method was carried out as follows. Guanidine nitrate, basic copper nitrate, ammonium perchlorate, strontium titanate, and talc were mixed by a mixing device to obtain a first material; 10% of distilled water was added to the first material and the first material was subjected to wet kneading for 50 min to obtain a second material, and the second material was caused to pass through a 30-mesh sieve to obtain a third material; the third material was dried to a water content less than 0.5% of the total mass of the third material and was caused to pass through the 30-mesh sieve again to obtain a fourth material; talc was added to the fourth material, and the material was molded by a rotary tablet press.

Example IV

In this example, except for replacing the strontium titanate with barium zirconate, the content of the rest of the formulation remains unchanged.

Experimental Example II

The prepared gas generant composition round tablets were loaded into the test generator, and the ignition and combustion test was performed to measure the total suspended particulates generated after combustion, which will be compared with the relevant data in USCAR. See Table 11 for specific contents and comparison results.

TABLE 11

Comparison of total suspended particulates

| No. | slagging agent | total suspended particulates, mg/3 | water insoluble matter, mg/3 | water soluble matter, mg/3 |
|---|---|---|---|---|
| USCAR Limits | | 83.33 | 33 | 50 |
| Example III | strontium titanate | 125.11 | 36.9 | 87.7 |
| Example IV | barium zirconate | 22.5 | 4.2 | 18.3 |

The prepared round tablets were put into the test generator and the ignition and combustion tests were carried out. After the test, the generator was dissected and the morphology of the tablets after burning was observed.

Figure 10:
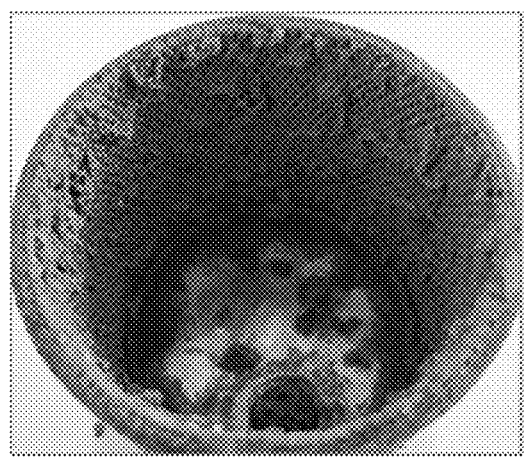
FIG. 10 is a picture showing the morphology of residues obtained after combustion of gas generant composition tablets in Example III of the present disclosure.
Figure 11:
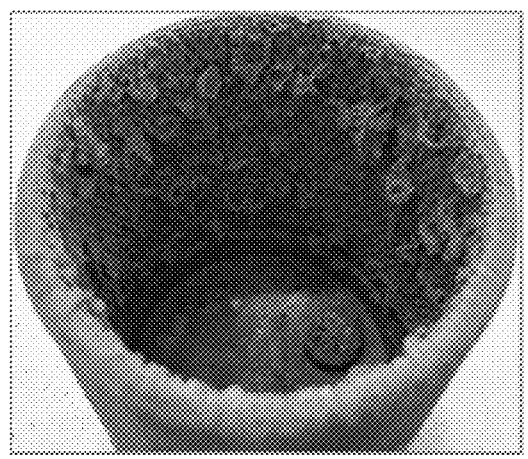
FIG. 11 is a picture showing the morphology of residues obtained after combustion of gas generant composition tablets in Example IV of the present disclosure

FIGS. 10 and 11 respectively show the morphology of the residues after combustion of the gas generant composition round tablets in Example III and Example IV (that is, the slagging agent is strontium titanate and barium zirconate, respectively).

It can be seen from FIG. 11 that compared to the morphology of the residue shown in FIG. 10, the gas generant composition round tablets with barium zirconate as the slagging agent are in the form of the original tablet after being burned at high temperature, which has a significant coagulation effect, and the residue tightly adheres to the inner wall of the filter screen, its density is relatively high, the tablet maintains its original shape very well, and has a harder strength and higher density to support it to maintain its original morphology.

In summary, by replacing and screening suitable slagging agents, the morphology of the residues after the generator is detonated can be effectively maintained, and the concentration of suspended matter in the air after the combustion of the gas generating agent can be reduced.

The above description is merely illustrative of the most preferable specific embodiments of the present disclosure, but the claimed scope of the present disclosure is not limited thereto. Any variations or alternatives that can readily envisaged by those skilled in the art within the technical scope disclosed in the present disclosure are intended to be encompassed within the claimed scope of the present disclosure.

Matters that are not described in detail in the specification of the present disclosure are technically well known to those skilled in the art.

What is claimed is:

1. A gas generant composition, comprising guanidine nitrate, basic copper nitrate and ammonium perchlorate, further comprising a slag-forming agent and a lubricant, wherein the slag-forming agent is at least one zirconate, at least one silicate or a mixture of
   at least one zirconate and at least one silicate,
   wherein contents, in percent by mass, of respective components are as follows:
   guanidine nitrate 40% to 60%;
   basic copper nitrate 25% to 50%;
   ammonium perchlorate 0% to 7%;
   slag-forming agent 1% to 10%;
   lubricant 0.05% to 5%; and wherein the slag-forming agent is a mixture of strontium zirconate and barium zirconate in a mass ratio of 1:0.5-3.

2. The gas generant composition according to claim 1, wherein the zirconate is one of strontium zirconate, barium zirconate and calcium zirconate, or a combination therefrom.

3. The gas generant composition according to claim 1, wherein the silicate is one of zirconium silicate and calcium silicate, or a combination therefrom.

4. The gas generant composition according to claim 1, wherein the lubricant is one of talc, graphite, calcium stearate, magnesium stearate, molybdenum disulfide and boron nitride, or a combination therefrom.

5. The gas generant composition according to claim 1, wherein the ammonium perchlorate has a particle size D90 not greater than 20 μm; and the slag-forming agent has a particle size D90 not greater than 5 μm.

6. The gas generant composition according to claim 1, wherein the basic copper nitrate and the lubricant each have a particle size D90 not greater than 5 μm.

7. The gas generant composition according to claim 1, wherein a sum of water contents in the respective components of the gas generant composition is not more than 1% of a total mass of the respective components.

8. The gas generant composition according to claim 1, wherein the gas generant composition is molded as a circular or elliptical sheet structure, a circular or elliptical columnar structure, a special-shaped sheet or columnar structure, a circular or elliptical monoporous structure, a circular or elliptical porous structure, or a special-shaped monoporous or porous structure.

9. The gas generant composition according to claim 8, wherein the circular sheet structure has a diameter of 3 to 15 mm and a height of 2 to 5 mm; the circular columnar structure has a diameter of 3 to 15 mm and a height of 5 to 15 mm; the circular monoporous structure has an inner diameter of 0.5 to 2.5 mm, an outer diameter of 3 to 15 mm and a height of 3 to 15 mm; and the elliptical monoporous structure has an inner diameter of 0.5 to 2.5 mm, a major diameter of 3 to 20 mm, a minor diameter of 2 to 12 mm and a height of 3 to 15 mm.

* * * * *